US012676399B2

(12) United States Patent
Lim et al.

(10) Patent No.: US 12,676,399 B2
(45) Date of Patent: Jul. 7, 2026

(54) ELECTRONIC DEVICE COMPRISING ANTENNA MODULE

(71) Applicant: Samsung Electronics Co., Ltd., Gyeonggi-do (KR)

(72) Inventors: Gunbae Lim, Gyeonggi-do (KR); Yongsang Yun, Gyeonggi-do (KR); Seongjin Park, Gyeonggi-do (KR); Jaebong Chun, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 5 days.

(21) Appl. No.: 18/651,727

(22) Filed: May 1, 2024

(65) Prior Publication Data

US 2024/0322419 A1 Sep. 26, 2024

Related U.S. Application Data

(63) Continuation of application No. PCT/KR2022/014096, filed on Sep. 21, 2022.

(30) Foreign Application Priority Data

Nov. 1, 2021 (KR) ........................ 10-2021-0148193

(51) Int. Cl.
*H01Q 1/22* (2006.01)
*H01Q 1/18* (2006.01)

(52) U.S. Cl.
CPC ............ *H01Q 1/2266* (2013.01); *H01Q 1/18* (2013.01)

(58) Field of Classification Search
USPC .......................................................... 343/702
See application file for complete search history.

(56) References Cited

U.S. PATENT DOCUMENTS 5,523,766 A 6/1996 Erceg
5,734,716 A 3/1998 Kulberg
(Continued)

FOREIGN PATENT DOCUMENTS

JP 2007-134871 A 5/2007
JP 2012-195740 A 10/2012
(Continued)

OTHER PUBLICATIONS

International Search Report dated Dec. 14, 2022.
Korean Office Action for KR Application No. 10-2021-0148193 mailed on Feb. 19, 2026.

*Primary Examiner* — Dimary S Lopez Cruz
*Assistant Examiner* — Brandon Sean Woods
(74) *Attorney, Agent, or Firm* — CANTOR COLBURN LLP

(57) ABSTRACT

According to certain embodiments of the present disclosure, an electronic device comprises: a display panel; a first housing in which the display panel is disposed; an input module; a second housing in which the input module is disposed, wherein the first housing is configured to be rotatable with respect to the second housing via a hinge module. The hinge module is fixably coupled to the second housing to rotate the first housing along a rotation axis of the first housing. An antenna unit is connected to at least a part of the rotation axis of the hinge module, wherein the antenna unit may include: a connector connected to the at least one part of the rotation axis; an antenna module connected to the connector and rotatable with respect to the connector on the rotation axis; and a weight connected to at least a portion of the antenna module and to maintain a radiation surface of the antenna module level substantially vertical with respect to the ground.

15 Claims, 12 Drawing Sheets

(56) References Cited

U.S. PATENT DOCUMENTS

| | | | |
|---|---|---|---|
| 5,844,985 A | 12/1998 | Kulberg et al. | |
| 2017/0373375 A1 | 12/2017 | Bologna et al. | |
| 2018/0210499 A1* | 7/2018 | Tsubaki | G06F 1/1616 |
| 2018/0348825 A1 | 12/2018 | Rittenhouse et al. | |
| 2020/0076065 A1 | 3/2020 | Zhou | |
| 2020/0251825 A1 | 8/2020 | Kim et al. | |
| 2021/0175608 A1 | 6/2021 | Ramasamy et al. | |

FOREIGN PATENT DOCUMENTS

| | | | | |
|---|---|---|---|---|
| JP | 2018-121149 A | | 2/2018 | |
| KR | 20-1999-0015857 U | | 5/1999 | |
| KR | 10-1999-0063864 A | | 7/1999 | |
| KR | 1999-0063664 A | | 7/1999 | |
| KR | 2002-0049392 A | | 6/2002 | |
| KR | 10-1301833 B1 | | 8/2013 | |
| KR | 10-2015-0056265 A | | 5/2015 | |
| KR | 20150056265 A | * | 5/2015 | H04B 1/59 |
| KR | 10-2018-0116732 A | | 10/2018 | |
| KR | 10-1904981 B1 | | 10/2018 | |
| KR | 10-2018-0134044 A | | 12/2018 | |
| KR | 10-2062905 B1 | | 1/2020 | |
| KR | 10-2091739 B1 | | 3/2020 | |

* cited by examiner (a)

(b)

(a)

(b)

ELECTRONIC DEVICE COMPRISING ANTENNA MODULE

CROSS-REFERENCE TO RELATED APPLICATION(S)

This application is a continuation of International Application No. PCT/KR2022/014096, filed on Sep. 21, 2022, which claims priority to Korean Patent Application No. 10-2021-0148193, filed on Nov. 1, 2021 in the Korean Intellectual Property Office, the disclosures of which are herein incorporated by reference.

TECHNICAL FIELD

The disclosure relates to an electronic device including a rotatable antenna module structure.

BACKGROUND

Due to the remarkable developments in information and semiconductor technology, the wide use of various electronic devices including a hand-held communication device is a daily norm.

Any popular electronic device performs a specific function according to a loaded program and includes as, an electronic notebook, a portable multimedia player, a mobile communication terminal, a tablet PC, an audio/video device, a desktop/laptop computer, or an in-vehicle navigation system. These electronic devices may output sound or an image based on stored information. As the integration level of electronic devices has increased and faster, high-capacity wireless communications have become more common in recent years. Now, a single electronic device such as a mobile communication terminal may be equipped with a variety of functions. For example, in addition to a communication function, an entertainment function such as games, a multimedia function such as music and video playback, a communication and security function such as mobile banking, and other functions such as calendar management and an electronic wallet are integrated into a single electronic device. Further, these electronic devices are being miniaturized so that they may be conveniently carried around by users.

Recently, a portable electronic device such as a smartphone with a flexible display having different hinge structures are coming into market. As such, a method of satisfying various requirements according to the structural characteristics of each housing structure in the electronic device has become important.

SUMMARY

According to an embodiment of the disclosure, an electronic device includes a display panel, a first housing at which the display panel is disposed, an input module, a second housing at which the input module is disposed. The hinge module is fixed to the second housing rotates along a rotation axis for rotation of the first housing in which an antenna unit is provided along the rotation axis of the hinge module. The antenna unit includes a connector and disposed along the rotation axis, an antenna module rotatably coupled to the connector and configured to rotate relative to the connector with respect to the rotation axis, and a weight connected to at least a portion of the antenna module to maintain a radiation surface of the antenna module substantially vertical with respect to a ground.

According to an embodiment of the disclosure, an electronic device includes a display panel, a first housing at which the display panel is disposed, an input module, a second housing at which the input module is disposed, wherein the first housing is configured to be rotatable with respect to the second housing via a hinge module along a first rotation axis, and an antenna unit connected to at least a portion of the first housing at a bottom of the display panel. The antenna unit includes a connector connected to the at least portion of the first housing and rotating around the first rotation axis, an antenna module connected to the connector and rotatable with respect to the connector around a second rotation axis different from the first rotation axis, and a weight connected to at least a portion of the antenna module and mounted to maintain a radiation surface of the antenna module substantially vertical with respect to a ground.

According to an embodiment of the disclosure, an electronic device includes a display panel, a first housing in which the display panel is disposed thereon, a second housing configured to be rotatable with respect to the first housing via a hinge module along a first rotation axis for rotation of the first housing and a second rotation axis parallel to the first rotation axis, and an antenna unit connected to at least a portion of the hinge module. The antenna unit includes a connector connected to the at least portion of the hinge module, an antenna module connected to the connector and rotatable with respect to the connector around a third rotation axis, and a weight connected to at least a portion of the antenna module and mounted to maintain a radiation surface of the antenna module substantially vertical with respect to a ground.

DETAILED DESCRIPTION

Figure 1:
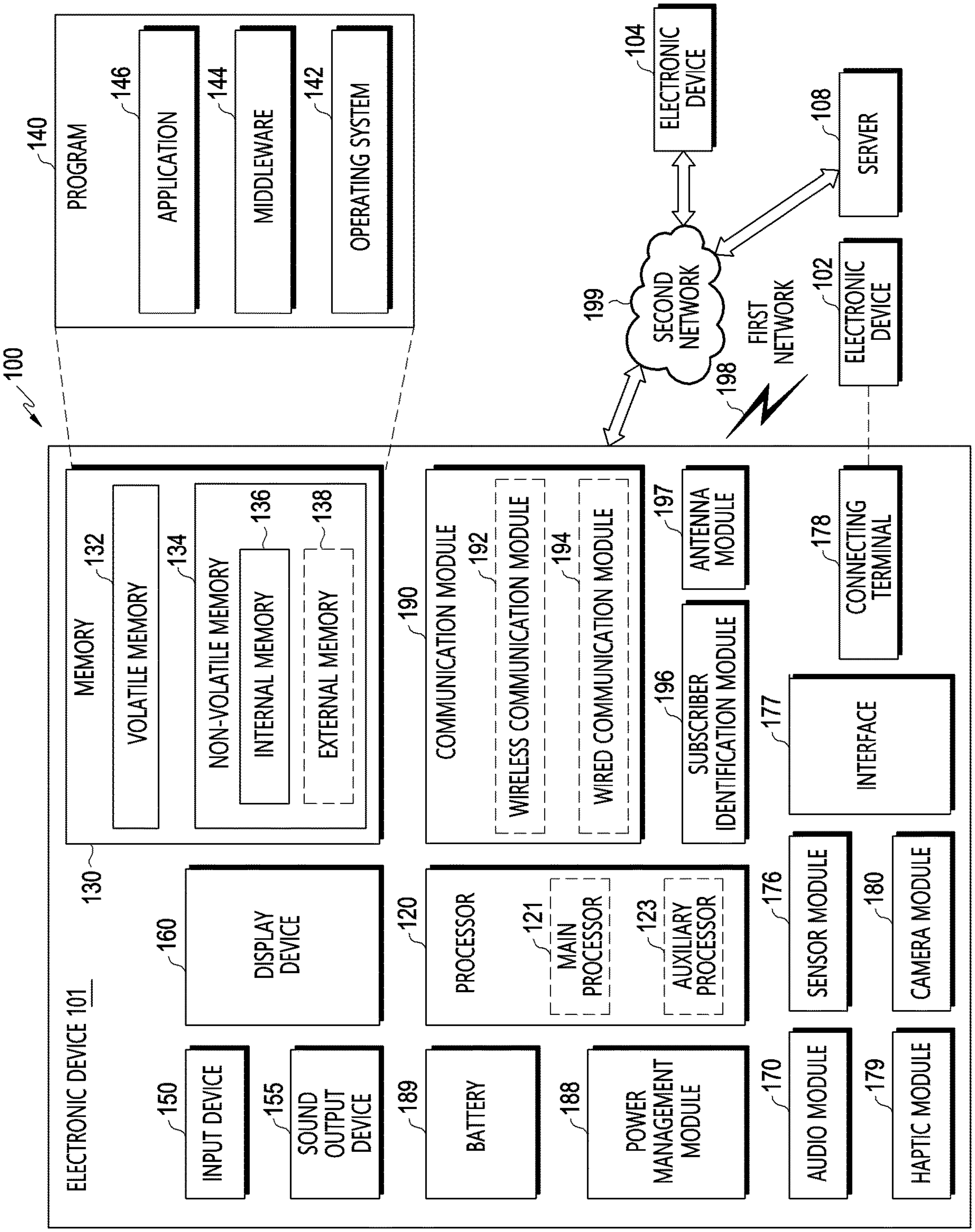
FIG. 1 is a block diagram illustrating an electronic device in a network environment according to an embodiment of the disclosure.

FIG. 1 is a block diagram illustrating an electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
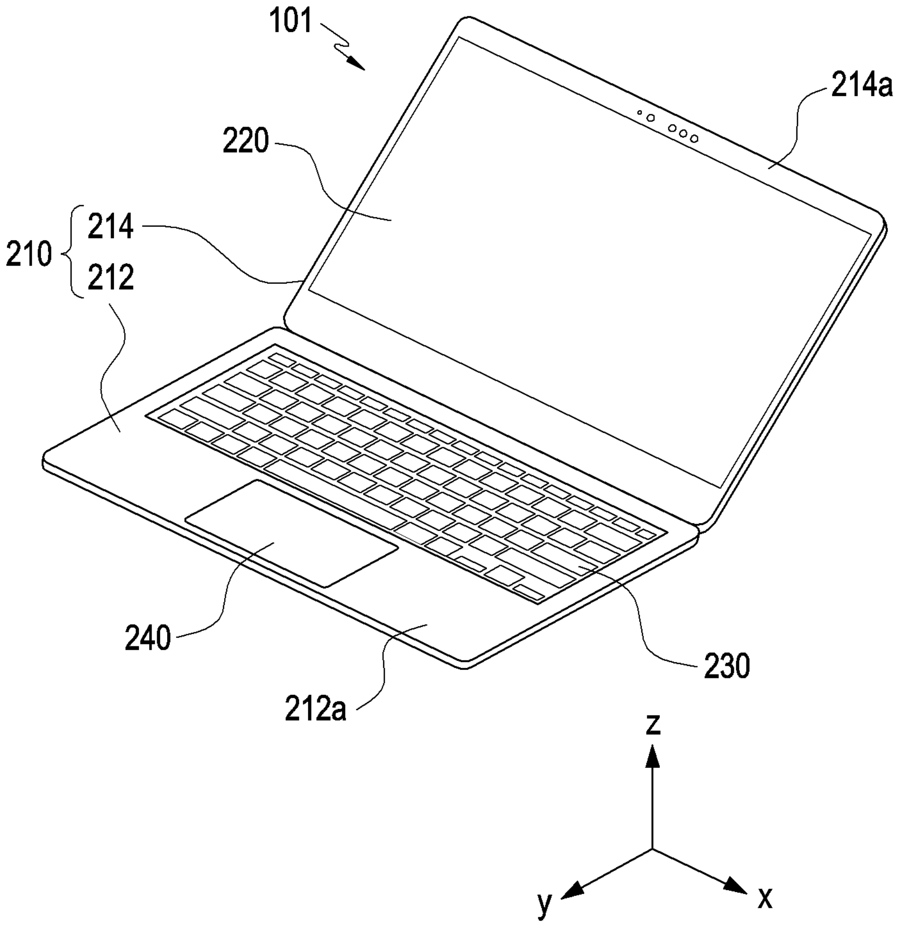
FIG. 2 is a front perspective view illustrating an electronic device according to an embodiment of the disclosure.

FIG. 2 is a diagram illustrating the electronic device 101 according to an embodiment of the disclosure. As shown, the electronic device 101 (e.g., the electronic device 101 in FIG. 1) may include a housing 210, a display 220, and a touch pad 240. According to an embodiment, the electronic device 101 may be a laptop computer, a notebook computer, a portable terminal, or any duplex electronic devices.

According to an embodiment, the housing 210 may form at least a portion of the exterior of the electronic device 101 or support a component (e.g., the touch pad 240) of the electronic device 101. For example, the housing 210 may accommodate at least one of the display 220, an input device 230, or the touch pad 240.

In operation, the electronic device 101 may be selectively open or closed. To this end, the housing 210 may include a first housing 212 and a second housing 214 rotatably connected to the first housing 212. According to an embodiment, the electronic device 101 may include a hinge module (e.g., a hinge module 510 in FIG. 6) connected to the housing 210. In particular, the hinge module (e.g., the hinge module 510 in FIG. 6) may be connected to the first housing 212 and the second housing 214. According to an embodiment, the first housing 212 may be configured to rotate by a specified angle (e.g., 0 degrees to 180 degrees) with respect to the second housing 214. A first front surface **212*a* of the first housing 212 may face a second front surface 212*b* of the second housing 214**.

According to an embodiment, the housing 210 may be formed of a rigid metallic material or non-metallic material. At least a portion of the electronic device 101 formed of the metallic material may provide a ground plane and be electrically connected to a ground line formed on a PCB (not shown). For example, a conductive plate may be disposed on an interior side of the housing 210, and the housing 210 may be electrically connected to the PCB through a connection member.

According to an embodiment, at least a portion of the display 220 may be disposed within the second housing 214. At least a portion of the display 220 may be visually exposed to the outside of the electronic device 101 through the second housing 214. According to an embodiment, the display 220 (e.g., the display module 160 in FIG. 1) may be a flexible display of which at least a partial area is transformable into a flat and/or curved surface. Further, the display 220 may be a foldable or rollable display.

According to an embodiment, the display 220 may be coupled to or disposed adjacent to a touch sensing circuit, a pressure sensor capable of measuring the intensity (pressure) of a touch, and/or a digitizer configured to detect a magnetic stylus pen.

According to an embodiment, the input device 230 (e.g., the input module 150 in FIG. 1) may detect a user input (e.g., pressure). According to an embodiment, the input device 230 may be disposed on the first housing 212. According to an embodiment, with the electronic device 101 closed, the input device 230 may face the display 220. The input device 230 may be a keyboard.

According to an embodiment, the touch pad 240 (e.g., the input module 150 in FIG. 1) may be configured to detect or receive a user input. The touch pad 240 may include a capacitive touch sensor, a touch sensor based on resistive sensing, an optical touch sensor, or a surface acoustic wave touch sensor. For example, the touch pad 240 may detect current, pressure, light, and/or vibration caused by an input that a user applies to the touch pad 240, and a processor (e.g., the processor 120 in FIG. 1) and/or the touch pad 240 may determine the user input based on a change in the detected current, pressure, light, and/or vibration.

According to an embodiment, the processor and/or the touch pad 240 may determine the position (e.g., XY coordinates) of the user input. According to an embodiment, the touch pad 240 may sense pressure on the touch pad 240. For example, the touch pad 240 may detect a force in a thickness direction (e.g., a Z-axis direction) using at least one pressure sensor (not shown). According to an embodiment, when an external object (e.g., the user's finger or stylus) is in direct contact with or proximity to a surface of the touch pad 240, the touch pad 240 may detect the external object.

According to an embodiment, the touch pad 240 may be accommodated in the housing 210. For example, the touch pad 240 may be connected to the first housing 212, and at least a portion of the touch pad 240 may be exposed to the outside of the first housing 212. According to an embodiment, the touch pad 240 may be adjacent to the input device 230, and with the electronic device 101 closed, at least a portion of the touch pad 240 may face the display 220.

Figure 3:
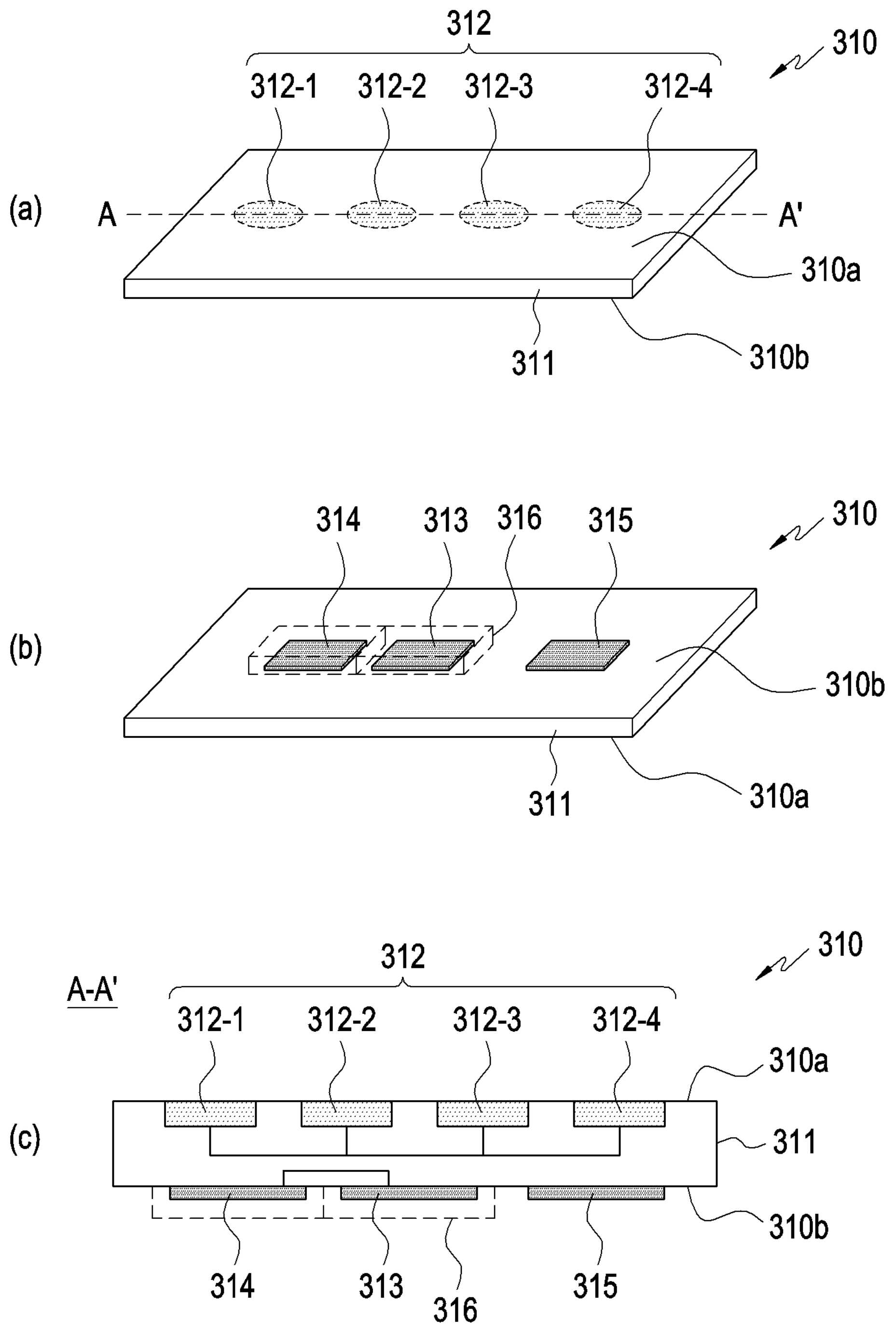
FIG. 3 is a diagram schematically illustrating the configuration of an antenna module 310 according to an embodiment of the disclosure.

FIG. 3 is a diagram schematically illustrating the configuration of an antenna module 310 according to an embodiment of the disclosure. FIG. 3(*a*) is a perspective view illustrating the antenna module 310 viewed from one side, and FIG. 3(*b*) is a perspective view illustrating the antenna module 310 viewed from another side. FIG. 3(*c*) is a cross-sectional view illustrating the antenna module 310, taken along A-A'.

Referring to FIG. 3, the antenna module 310 (e.g., the antenna module 197 in FIG. 1) may include a PCB 311, an antenna array 312, a radio frequency integrated circuit (RFIC) 313, a power manage integrated circuit (PMIC) 314, and a module interface 315. Optionally, the antenna module 310 may further include a shielding member 316. In other embodiments, at least one of the above-mentioned components may be omitted, or at least two of the components may be integrally formed.

According to an embodiment, the PCB 311 may include a plurality of conductive layers and a plurality of non-conductive layers stacked alternately with the conductive layers. The PCB 311 may provide electrical connections between the PCB 311 and/or various externally disposed electronic components using wirings and conductive vias formed on the conductive layers.

According to an embodiment, the antenna array 312 may include a plurality of antenna elements 312-1, 312-2, 312-3, and 312-4 arranged to form directional beams. The antenna elements may be formed on a first surface **310*a* of the PCB 311, as illustrated. According to another embodiment, the antenna array 312 may be formed within the PCB 311. According to embodiments, the antenna array 312** may include a plurality of antenna arrays of the same or different shapes or types (e.g., a dipole antenna array and/or a patch antenna array).

According to an embodiment, the RFIC 313 may be disposed in another area (e.g., on a second surface 310*b* opposite to the first surface 310*a*) of the PCB 311, spaced apart from the antenna array 312. For example, the RFIC 313 may be bonded to the PCB 311 by soldering. According to an embodiment, the RFIC 313 is configured to process a signal in a selected frequency band, which is transmitted/received via the antenna array 312. According to an embodiment, the RFIC 313 may convert a baseband signal obtained from a communication processor (not shown) into an RF signal in a specified band during transmission. The RFIC 313 may convert an RF signal received via the antenna array 312 into a baseband signal and transmit the baseband signal to the communication processor during reception.

According to another embodiment, the RFIC 313 may upconvert an IF signal (e.g., about 9 GHz to about 11 GHz) obtained from an intermediate frequency integrated circuit (IFIC) into an RF signal in a selected band during transmission. The RFIC 313 may downconvert an RF signal obtained via the antenna array 312 to an IF signal and transmit the IF signal to the IFIC during reception.

According to an embodiment, the PMIC 314 may be disposed in another partial area (e.g., the second surface 310*b*) of the PCB 311, spaced apart from the antenna array 312. For example, the PMIC 314 may be bonded to the PCB 311 by soldering. The PMIC 314 may receive a voltage from a main PCB (not shown) and supply required power to various components (e.g., the RFIC 313) on the antenna module.

According to an embodiment, the shielding member 316 may be disposed on a portion (e.g., the second surface 310*b*) of the PCB 311 to electromagnetically shield at least one of the RFIC 313 or the PMIC 314. According to an embodiment, the shielding member 316 may include a shield can.

Although not shown, in an embodiment, the antenna module 310 may be electrically connected to another PCB (e.g., the main circuit board) via the module interface 315. The module interface 315 may include a connection member, such as a coaxial cable connector, a board to board connector, an interposer, or a flexible PCB (FPCB). The RFIC 313 and/or the PMIC 314 of the antenna module 310 may be electrically connected to the other PCB through the connection member.

Figure 4:
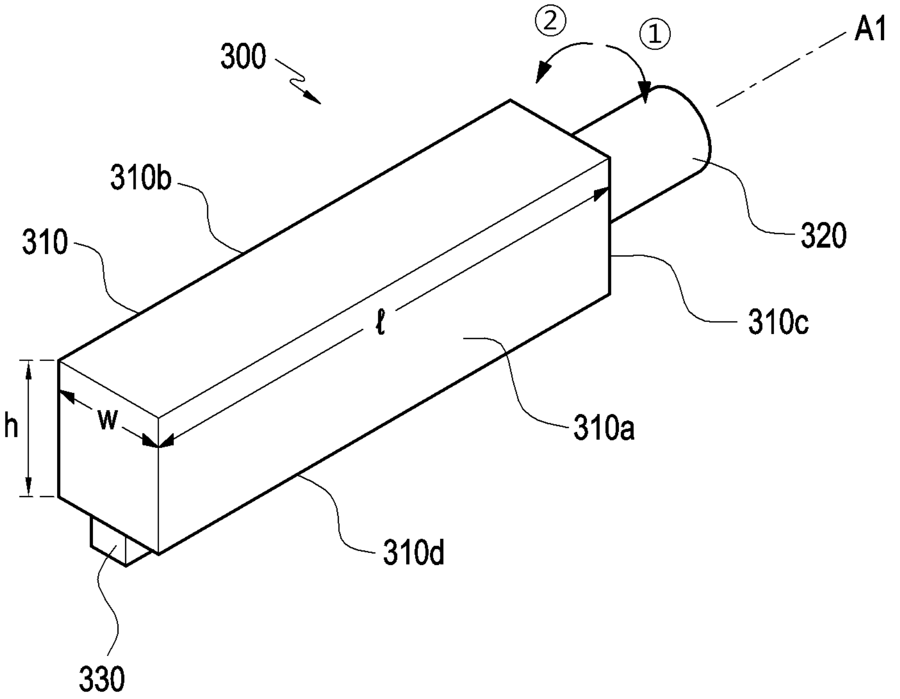
FIG. 4 is a diagram schematically illustrating an antenna structure 300 including the antenna module 310 of FIG. 3 according to an embodiment of the disclosure.

FIG. 4 is a diagram schematically illustrating an antenna structure 300 including the antenna module 310 of FIG. 3 according to an embodiment of the disclosure.

Referring to FIG. 4, the antenna structure 300 may include the antenna module 310, an antenna connector 320, and a weight 330. According to an embodiment, the antenna module 310 may transmit and receive millimeter-waves (or mmWaves) in accordance with 5G communication. The millimeter waves may have an ultra-high frequency of about 6 to 300 GHz. According to an embodiment, the antenna module 310 may have a cuboidal shape. For example, the antenna module 310 may have a cuboidal shape with a width w of about 3.5 mm to 4.2 mm, a height h of about 1.75 mm to 2.15 mm, and a length 1 of about 23.3 mm. According to an embodiment, an mmWave signal may be radiated through the first surface 310*a* of the antenna module 310. According to an embodiment, metal shielding members that shield electromagnetic waves may be disposed on surfaces of the antenna module 310 other than the first surface 310*a* to prevent mmWave signals from being radiated from the other surfaces of the antenna module 310. For example, the shielding member 316 may be disposed on the second surface 310*b* of the antenna module 310. The antenna structure 300 may be referred to as an antenna unit.

According to an embodiment, the antenna connector 320 may connect the antenna module 310 to an electronic device (e.g., the electronic device 101 in FIG. 2). The antenna connector 320 may be coupled to one of the surfaces other than the first surface 310*b* and the second surface 320*b* of the antenna module 310. For example, the antenna connector 320 may be coupled to a third surface 310*c* of the antenna module 310. According to an embodiment, the antenna module 310 may be rotatably coupled to a shaft structure of the antenna connector 320. For example, the antenna module 310 may rotate by approximately 360 degrees along a first rotation axis A1 parallel to the shaft structure of the antenna connector 320. According to an embodiment, a direction in which the antenna module 310 rotates along the first rotation axis A1 may be clockwise (a direction ① or counterclockwise (a direction ②.

According to an embodiment, the weight 330 may be coupled to the antenna module 310 to keep a direction in which the first surface 310*a* faces constant even though the antenna module 310 is rotated by the antenna connector 320. According to an embodiment, the weight 330 may be coupled to one of surfaces perpendicular to the first surface 310*a*, the second surface 310*b*, and the third side 310*c* to which the antenna connector 320 is coupled, of the antenna module 310. For example, the weight 330 may be coupled to a fourth surface 310*d* of the antenna module 310.

According to various embodiments, the antenna module 310 may include a support member (not shown). According to an embodiment, the antenna module 310 may be fixed to the support member, and the support member may be disposed such that the antenna connector 320 and the weight 330 are coupled. The support member may be rotatably coupled to the shaft structure of the antenna connector 320.

Figure 5:
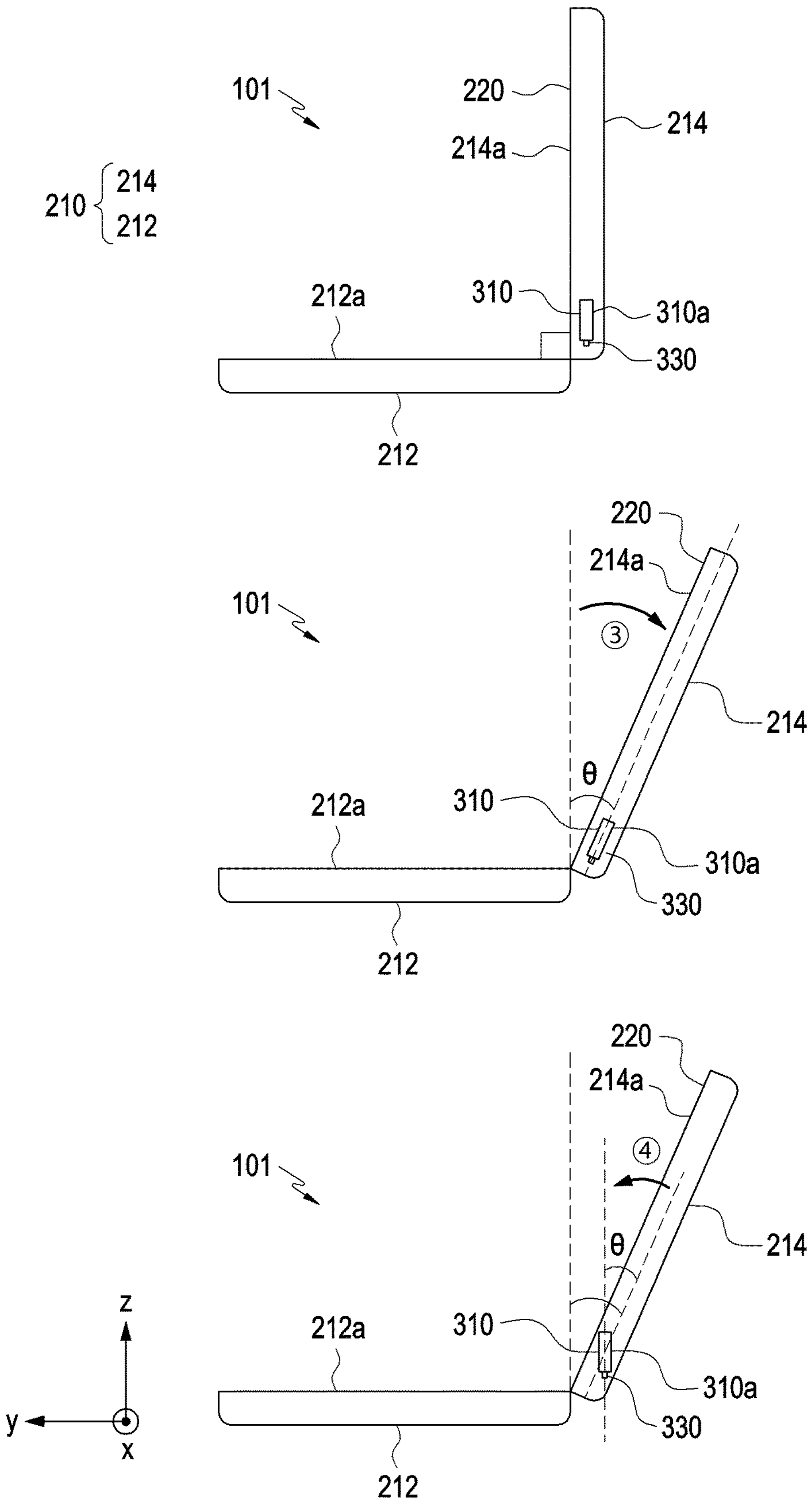
FIG. 5 is a diagram illustrating movement of the antenna module 310 of FIG. 4 mounted in an electronic device 101 of FIG. 2 according to an embodiment of the disclosure.

FIG. 5 is a diagram illustrating movement of the antenna module 310 of FIG. 4 mounted in the electronic device 101 of FIG. 2 according to an embodiment of the disclosure.

Figure 6:
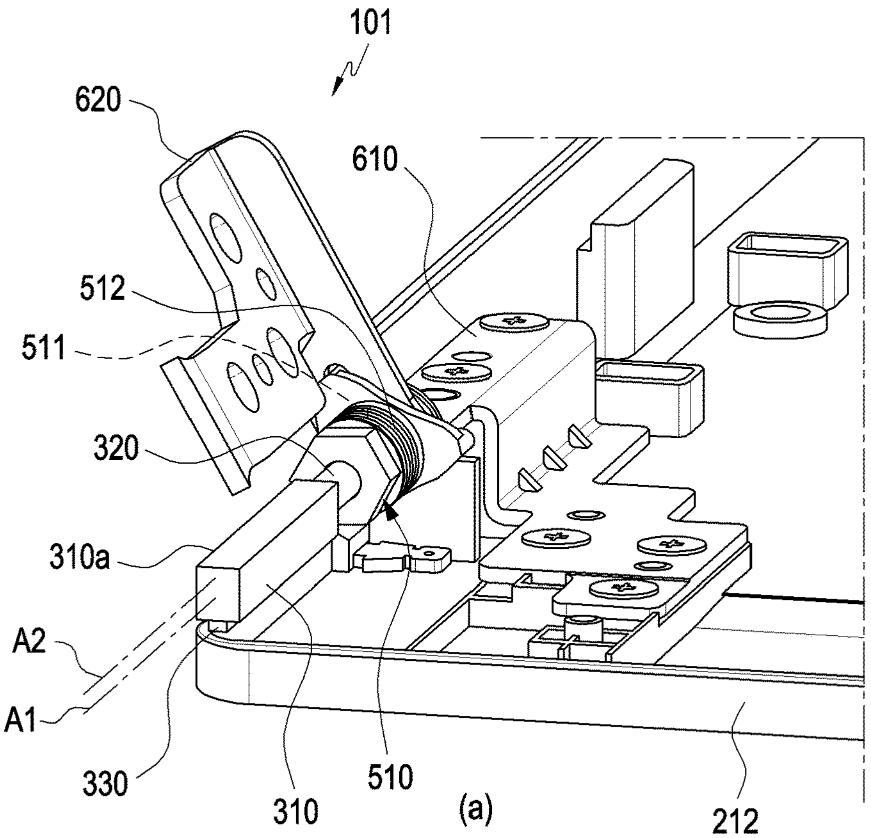
FIG. 6 is a diagram illustrating an embodiment in which the antenna module 310 of FIG. 3 is coupled to a shaft structure of a hinge module in the electronic device 101 of FIG. 2 according to an embodiment of the disclosure.
Figure 6:
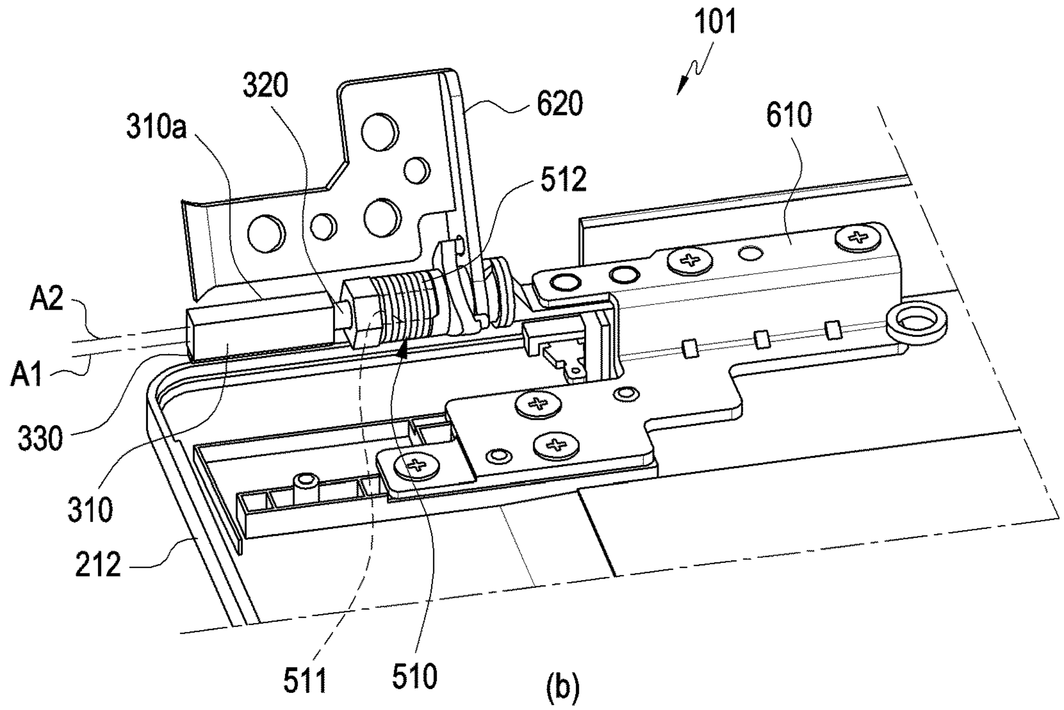
Figure 7:
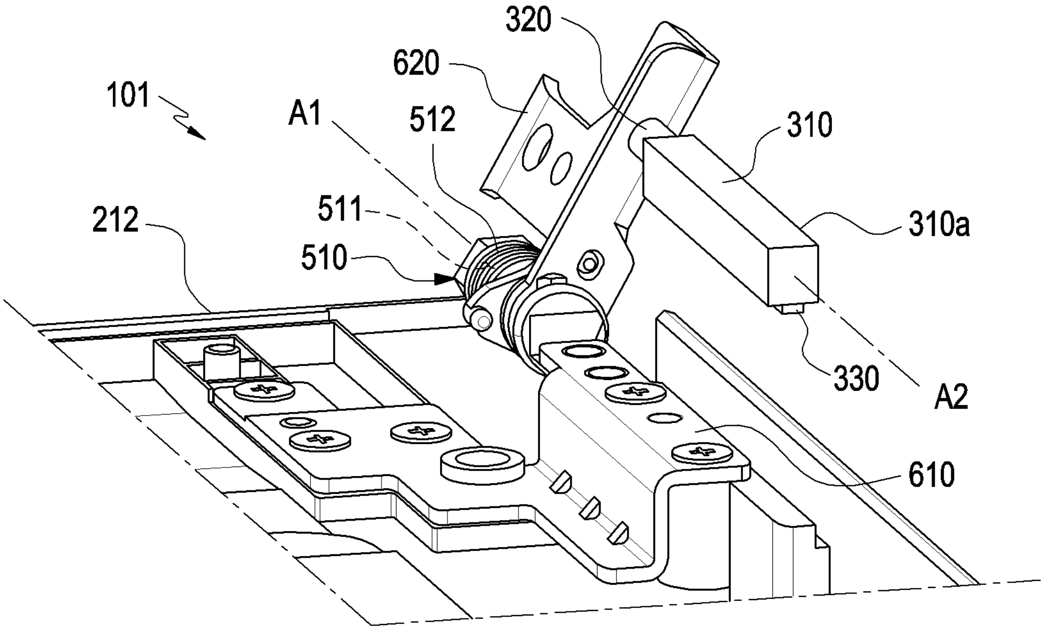
FIG. 7 is a diagram illustrating an embodiment in which the antenna structure 300 of FIG. 4 is coupled to a second hinge plate connected to a second housing of the electronic device 101 of FIG. 2 according to an embodiment of the disclosure.
Figure 7:
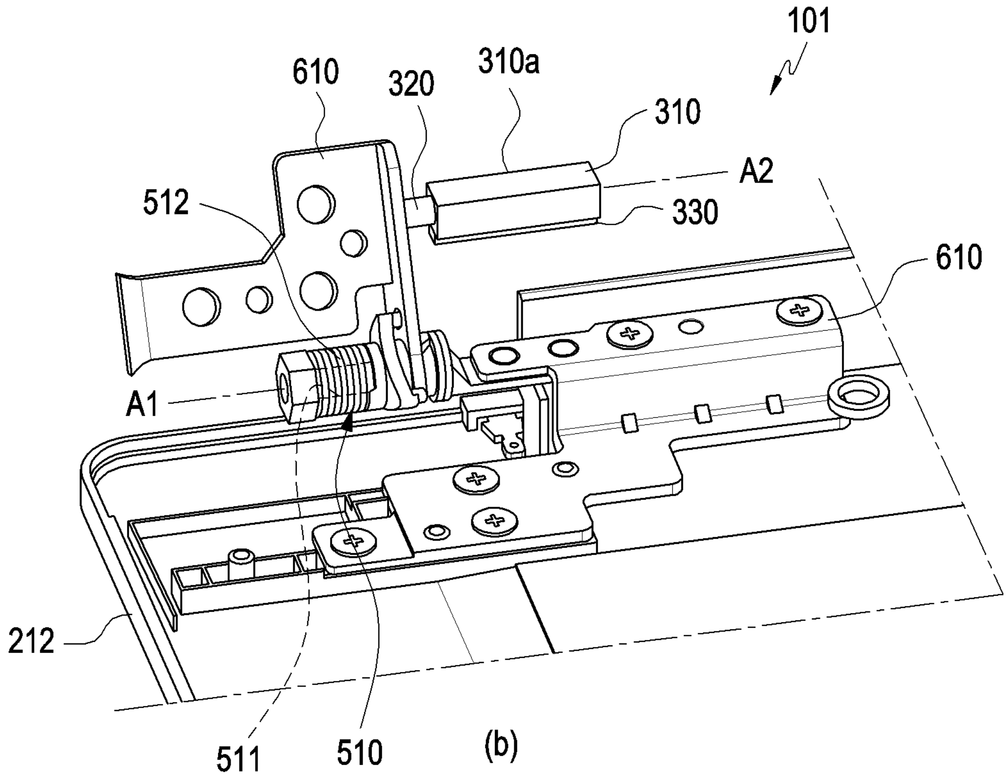

Referring to FIG. 5, the antenna module 310 may be coupled to a shaft structure (e.g., a shaft structure 511 in FIG. 6) of a hinge module (e.g., the hinge module 510 in FIG. 6) of the electronic device 101 through the antenna connector 320 (the embodiment of FIG. 6) or to a hinge plate (e.g., a second hinge plate 620 in FIG. 6) connecting the second housing 214 of the electronic device 101 and the hinge module (e.g., the hinge module 510 in FIG. 6) through the antenna connector 320 (the embodiment of FIG. 7). According to an embodiment, on the assumption that a state where the first housing 212 and the second housing 214 of the electronic device 101 are at a right angle to each other is an initial state, the first surface 310*a* of the antenna module 310 may face a direction horizontal to the ground, and the weight 330 may face a direction perpendicular to the ground due to gravitation force such that the first surface 310*a* maintains vertical with respect to the ground.

According to an embodiment, the second housing 214 of the electronic device 101 may rotate clockwise (a direction ③ by an angle θ that satisfies a specific range (e.g., about 0 to 90 degrees) with respect to the first housing 212 from the initial state. According to an embodiment, when the second housing 214 of the electronic device 101 rotates clockwise (the direction ③ by the angle θ, the antenna module 310 may also rotate clockwise (the direction ③ by the angle θ because the antenna module 310 is rotatably connected to the hinge module (e.g., the hinge module 510 in FIG. 6) through the antenna connector 320. According to an embodiment, when the second housing 214 of the electronic device 101 rotates clockwise (the direction ③) by the angle θ with respect to the first housing 212 such that the first housing 212 and the second housing 214 form an angle (90 degrees+θ), the antenna module 310 is rotatable with respect to the antenna connector 320, and the weight 330 coupled to the antenna module 310 is subjected to a force (e.g., gravity) toward the ground. Therefore, the antenna module 310 may rotate counterclockwise by the angle θ by the weight 330 such that the first surface 310*a* of the antenna module 310 maintains vertical with respect to the ground. According to an embodiment, even if the second housing 214 of the electronic device 101 rotates clockwise (the direction ③) by the angle θ with respect to the first housing 212 such that the first housing 212 and the second housing 214 form the angle (90 degrees+θ), the antenna module 310 may rotated counterclockwise (a direction ④) by the angle θ so that the first face 310*a* of the antenna module 310 maintains the same horizontal orientation as in the initial state.

While it has been described with reference to FIG. 5 that after the second housing 214 rotates, the antenna module 310 rotates by the same angle in a direction opposite to the direction of the rotation of the second housing 214, this is an illustrative rotation order of the second housing 214 and the antenna module 310, for convenience, and it is possible for the second housing 214 and the antenna module 310 to rotate simultaneously or with a time difference. In addition, FIG. 5 is based on the assumption that the second housing 214 rotates clockwise (in the direction ③) by the angle θ. However, FIG. 5 is also applicable when the second housing 214 rotates counterclockwise (in the direction ④) by the angle θ.

FIG. 6 is a diagram illustrating an embodiment in which the shaft structure of the hinge module of the electronic device 101 of FIG. 2 is coupled to the antenna module 310 of FIG. 3 according to an embodiment of the disclosure. FIG. 6(*a*) is a diagram illustrating the electronic device 101 of FIG. 2 viewed from a side, and FIG. 6(*b*) is a diagram illustrating the electronic device 101 of FIG. 2 viewed from the front.

Referring to FIG. 6, the electronic device 101 may include the hinge module 510 connecting the first housing 212 and the second housing 214 to each other, the hinge module 510 may include the shaft structure 511 and an elastic member 512 coupled to the shaft structure 511. According to an embodiment, the hinge module 510 may include a first hinge plate 610 coupled to the first housing 212 and the second hinge plate 620 coupled to the second housing 214. For example, as the first hinge plate 610 is formed at a position extending from the shaft structure 511 of the hinge module 510 and coupled to the first housing 212, the first hinge plate 610 may fix the hinge module 510 to the first housing 212, and as the second hinge plate 620 is rotatably coupled to the shaft structure 511 of the hinge module 510, the second housing 214 coupled to the second hinge plate 620 is rotatable with respect to the first housing 212. In another embodiment, the first hinge plate 610 and the second hinge plate 620 may be portions of the first housing 212 and the second housing 214, respectively. According to an embodiment, the second hinge plate 620 may rotate along the first rotation axis A1 parallel to the shaft structure 511 of the hinge module 510. According to an embodiment, the elastic member 512 of the hinge module 510 may be coupled to the shaft structure 511 to adjust the rotation of the second hinge plate 620. According to an embodiment, the antenna module 310 may be rotatably coupled to the shaft structure 511 of the hinge module 510 along a second rotation axis A2 parallel to the first rotation axis A1 through the antenna connector 320. According to an embodiment, the centers of the first rotation axis A1 and the second rotation axis A2 may be substantially the same. According to an embodiment, the first surface 310*a* of the antenna module 310 may maintain its vertical with respect to the ground by the weight 330 coupled to the antenna module 310, even if the antenna module 310 is rotated around the first rotation axis A1 by the hinge module 510. For example, even when the antenna connector 320 is coupled to the shaft structure 511 of the hinge module 510 and rotates around the first rotation axis A1 in the same direction as the second hinge plate 620, the antenna module 310 is rotatable with respect to the antenna connector 320. Therefore, the antenna module 310 may be rotated, by the weight 330 coupled to the antenna module 310, around the second rotation axis A1 by the same angle in a direction opposite to the direction in which the second hinge plate 620 rotates, thereby enabling the first surface 310*a* of the antenna module 310 to maintain vertical with respect to the ground.

FIG. 7 is a diagram illustrating an embodiment in which the antenna structure 300 of FIG. 4 is coupled to the second hinge plate connected to the second housing of the electronic device 101 of FIG. 2 according to an embodiment of the disclosure. FIG. 7(*a*) is a diagram illustrating the electronic device 101 of FIG. 2 viewed from a side, and FIG. 7(*b*) is a diagram illustrating the electronic device 101 of FIG. 2 viewed from the front.

Referring to FIG. 7, the electronic device 101 may include the hinge module 510 connecting the first housing 212 and the second housing 214 to each other. The hinge module 510 may include the shaft structure 511 and the elastic member 512 coupled to the shaft structure 511. According to an embodiment, the hinge module 510 may include the first hinge plate 610 coupled to the first housing 212 and the second hinge plate 620 coupled to the second housing 214. According to an embodiment, as the first hinge plate 610 is formed at a position extending from the shaft structure 511 of the hinge module 510 and coupled to the first housing 212, the first hinge plate 610 may fix the hinge module 510 to the first housing 212, and as the second hinge plate 620 is rotatably coupled to the shaft structure 511 of the hinge module 510, the second housing 214 coupled to the second hinge plate 620 is rotatable with respect to the first housing 212. In another embodiment, the first hinge plate 610 and the second hinge plate 620 may be portions of the first housing 212 and the second housing 214, respectively. According to an embodiment, the second hinge plate 620 may rotate along the first rotation axis A1 parallel to the shaft structure 511 of the hinge module 510. According to an embodiment, the antenna module 310 may be coupled to the second hinge plate 620 such that the antenna module is rotatable along the second rotation axis A2 through the antenna connector 320 in a space between the hinge module 510 and the bottom of the display 220 disposed in the second housing 214. According to an embodiment, the weight 330 coupled to the antenna module 310 may enable the first surface 310*a* of the antenna module 310 to maintain vertical with respect to the ground, even if the antenna module 310 is rotated around the first rotation axis A1 by the second hinge plate 620. For example, even when the antenna connector 320 is coupled to the second hinge plate 620 and rotates around the first rotation axis A1 in the same direction as the second hinge plate 620, the antenna module 310 is rotatable with respect to the antenna connector 320. Therefore, the antenna module 310 may be rotated, by the weight 330 coupled to the antenna module 310, around the second rotation axis A1 by the same angle in the direction opposite to the direction in which the second hinge plate 620 rotates, thereby enabling the first surface 310*a* of the antenna module 310 to maintain vertical with respect to the ground.

Figure 8:
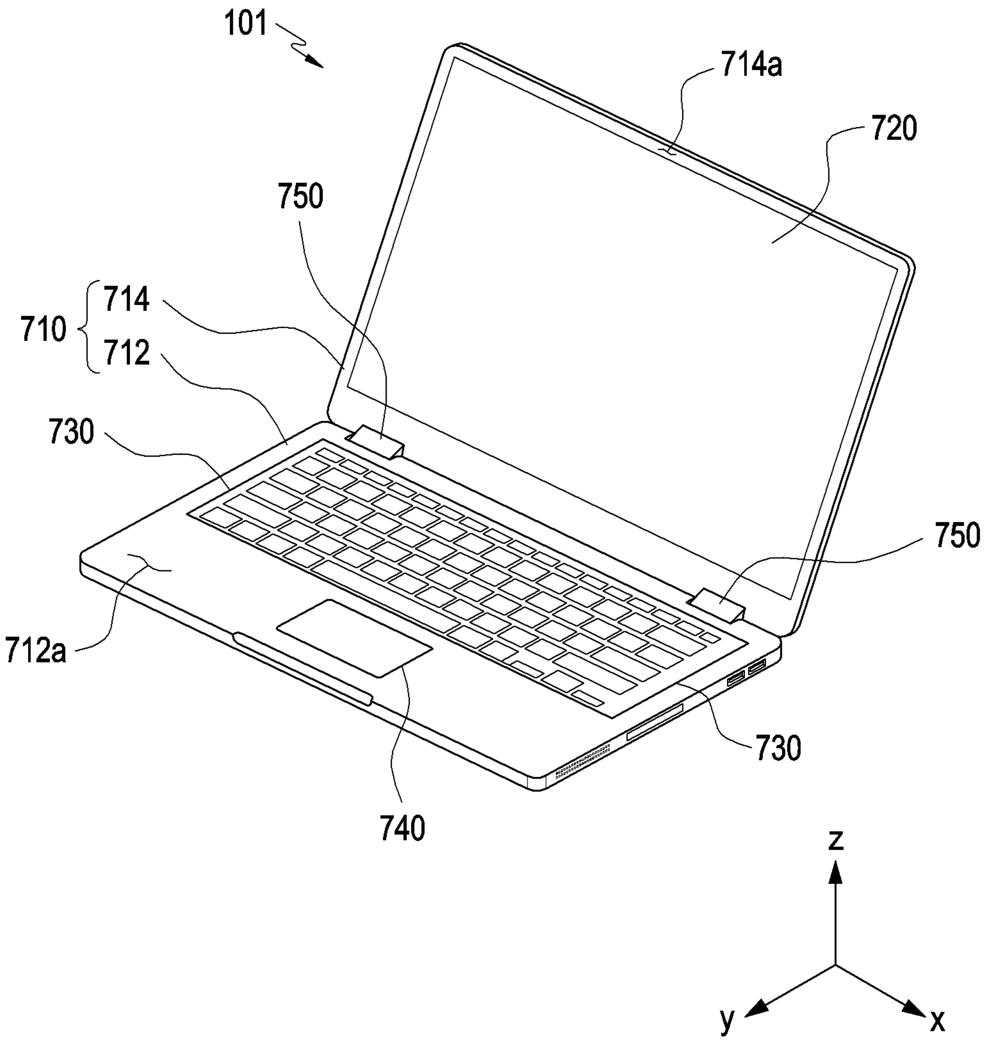
FIG. 8 is a diagram illustrating a first state of a convertible-type electronic device 101 according to an embodiment of the disclosure.
Figure 9:
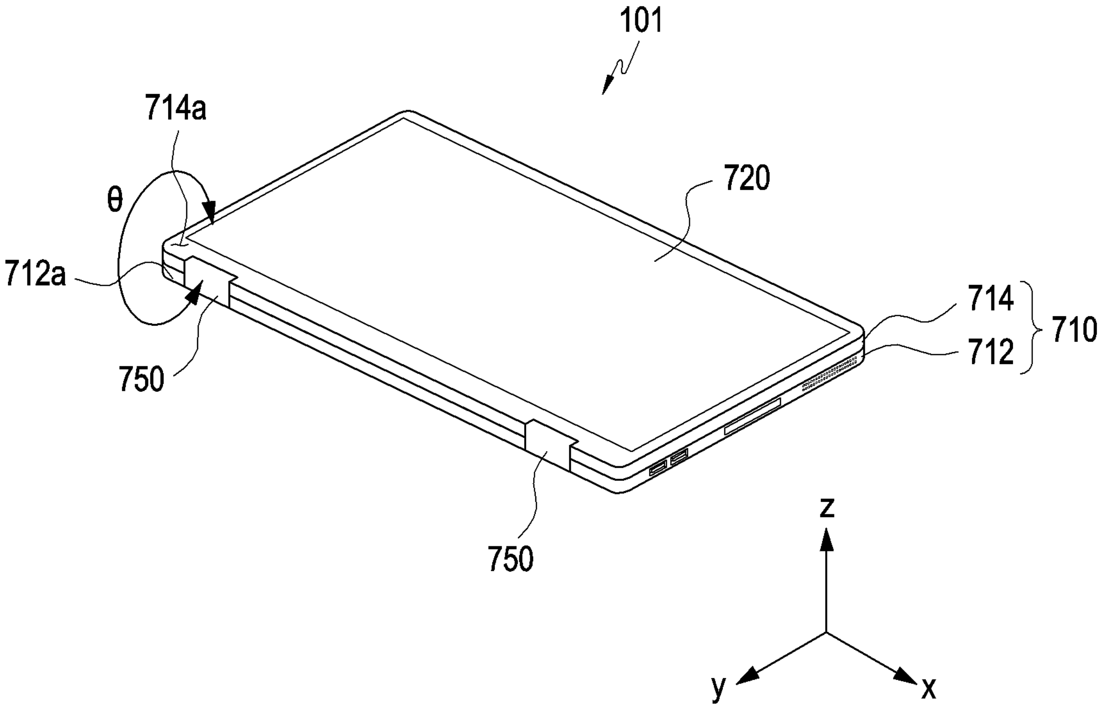
FIG. 9 is a diagram illustrating a second state of the convertible-type electronic device 101 according to an embodiment of the disclosure.

FIG. 8 is a diagram illustrating a first state of a convertible-type electronic device 101 according to an embodiment of the disclosure. FIG. 9 is a diagram illustrating a second state of the convertible-type electronic device 101 according to an embodiment of the disclosure.

Referring to FIGS. 8 and 9, the electronic device 101 (e.g., the electronic device 101 in FIG. 1) may include a housing 710 and a display 720. According to an embodiment, the electronic device 101 may be a laptop computer, a notebook computer, or a portable terminal.

According to an embodiment, the housing 710 may form at least a portion of the exterior of the electronic device 101 or support a component (e.g., the display 720) of the electronic device 101. For example, the housing 710 may accommodate at least one of the display 720, an input device 730, or a touch pad 740.

According to an embodiment, the electronic device 101 may be open or closed. For example, the housing 710 may include a first housing 712 and a second housing 714 configured to be rotatable with respect to the first housing 712. According to an embodiment, the electronic device 101 may include at least one hinge module 750 connected to the first housing 712 and the second housing 7140.

According to an embodiment, the first housing 712 may be configured to rotate by a specified angular range (e.g., approximately 0 degrees to 360 degrees) with respect to the second housing 714 using the hinge module 750. For example, the electronic device 101 may be operated in a first state (e.g., FIG. 7) (clamshell mode). In the first state, an angle θ between a first front surface 712*a* of the first housing 712 and a second front surface 714*a* of the second housing 714 may be about 90 degrees to 130 degrees. In another example, the electronic device 101 may be operated in a second state (e.g., FIG. 8) (tablet mode). In the second state, the angle θ between the first housing 712 and the second housing 714 may be about 360 degrees. According to an embodiment, the rotation of the first housing 712 with respect to the second housing 714 may be interpreted as the rotation of the second housing 714 with respect to the first housing 712.

According to an embodiment, the housing 710 may be formed of a rigid metallic material or non-metallic material. According to an embodiment, at least a portion of the electronic device 101 formed of the metallic material may provide a ground plane and be electrically connected to a ground line formed on a PCB (not shown). For example, a conductive plate may be disposed on an interior side of the housing 710 and electrically connected to the PCB through a connection member.

According to an embodiment, at least a portion of the display 720 may be disposed within the second housing 714. According to an embodiment, at least a portion of the display 720 may be visually exposed to the outside of the electronic device 101. According to an embodiment, the display 720 (e.g., the display module 160 in FIG. 1) may be a flexible display of which at least a partial area is transformable into a flat and/or curved surface. For example, the display 720 may be a foldable or rollable display.

According to an embodiment, the display 720 may be coupled to or disposed adjacent to a touch sensing circuit, a pressure sensor capable of measuring the intensity (pressure) of a touch, and/or a digitizer configured to detect a magnetic stylus pen.

According to an embodiment, the electronic device 101 may include the input device 730 (e.g., the input module 150 in FIG. 1) capable of detecting a user input (e.g., pressure). According to an embodiment, the input device 730 may be disposed on the first housing 712. According to an embodiment, with the electronic device 101 closed, at least a portion of the input device 730 may face at least a portion of the display 720. For example, the input device 730 may be a keyboard.

According to an embodiment, the electronic device 101 may include the touch pad 740 (e.g., the input module 150 in FIG. 1) configured to detect or receive a user input. The touch pad 740 may include a capacitive touch sensor, a touch sensor based on resistive sensing, an optical touch sensor, or a surface acoustic wave touch sensor. For example, the touch pad 740 may detect current, pressure, light, and/or vibration caused by an input that a user applies to the touch pad 740, and a processor (e.g., the processor 120 in FIG. 1) and/or the touch pad 740 may determine the user input based on a change in the detected current, pressure, light, and/or vibration.

According to an embodiment, the processor and/or the touch pad 740 may determine the position (e.g., XY coordinates) of the user input. According to an embodiment, the touch pad 740 may sense pressure on the touch pad 740. For example, the touch pad 740 may detect a force in a thickness direction (e.g., a Z-axis direction) using at least one pressure sensor (not shown). According to an embodiment, the touch pad 740 may detect an external object (e.g., the user's finger or stylus), when the external object is in direct contact with or proximity to a surface of the touch pad 740.

According to an embodiment, the touch pad 740 may be accommodated in the housing 710. For example, the touch pad 740 may be connected to the first housing 712, and at least a portion of the touch pad 740 may be exposed to the outside of the first housing 712. According to an embodiment, the touch pad 740 may be adjacent to the input device 730. According to an embodiment, when the electronic device 101 is closed, at least a portion of the touch pad 740 may face the display 720.

Figure 10A:
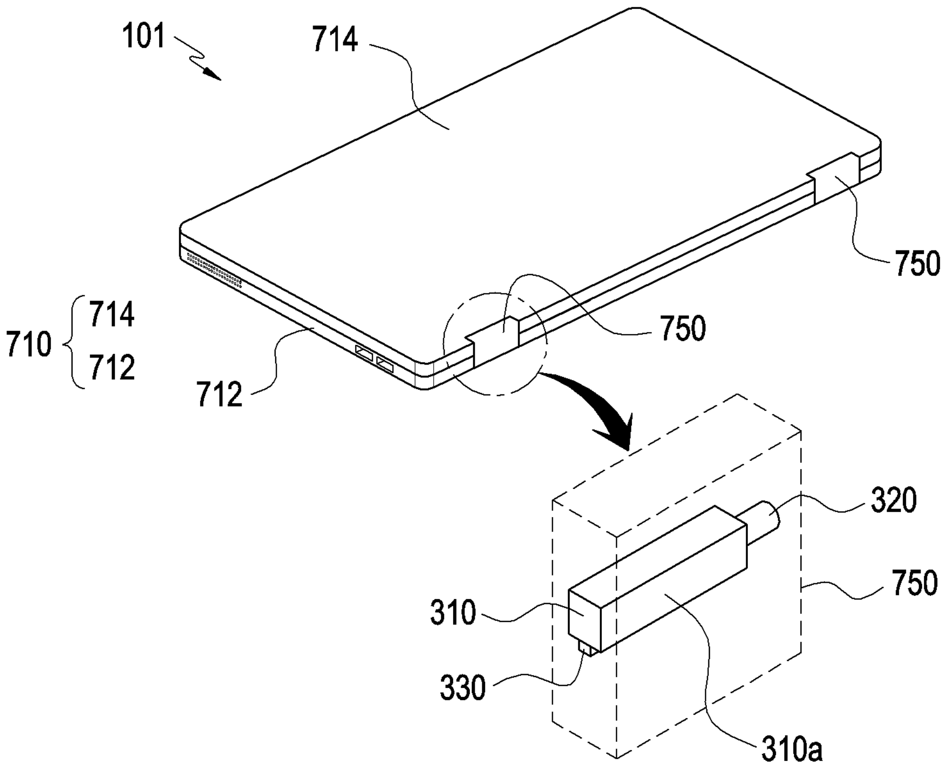
FIG. 10A is a diagram illustrating an embodiment in which the antenna module 310 of FIG. 3 is mounted in a hinge module in a closed state of the electronic device 101 of FIG. 7.
Figure 10B:
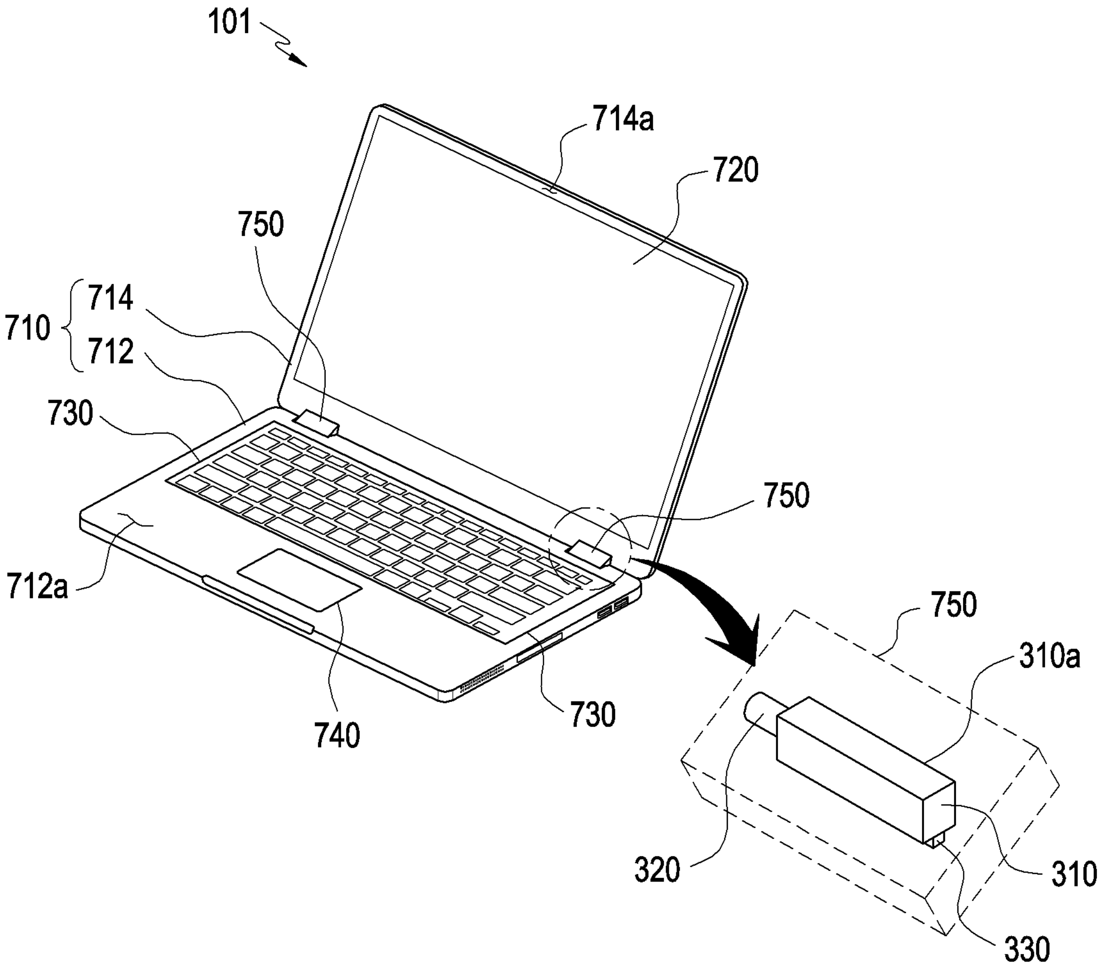
FIG. 10B is a diagram illustrating an embodiment in which the antenna module 310 of FIG. 3 is mounted in the hinge module in the first state (e.g., clamshell mode) of the electronic device 101 of FIG. 7.
Figure 10C:
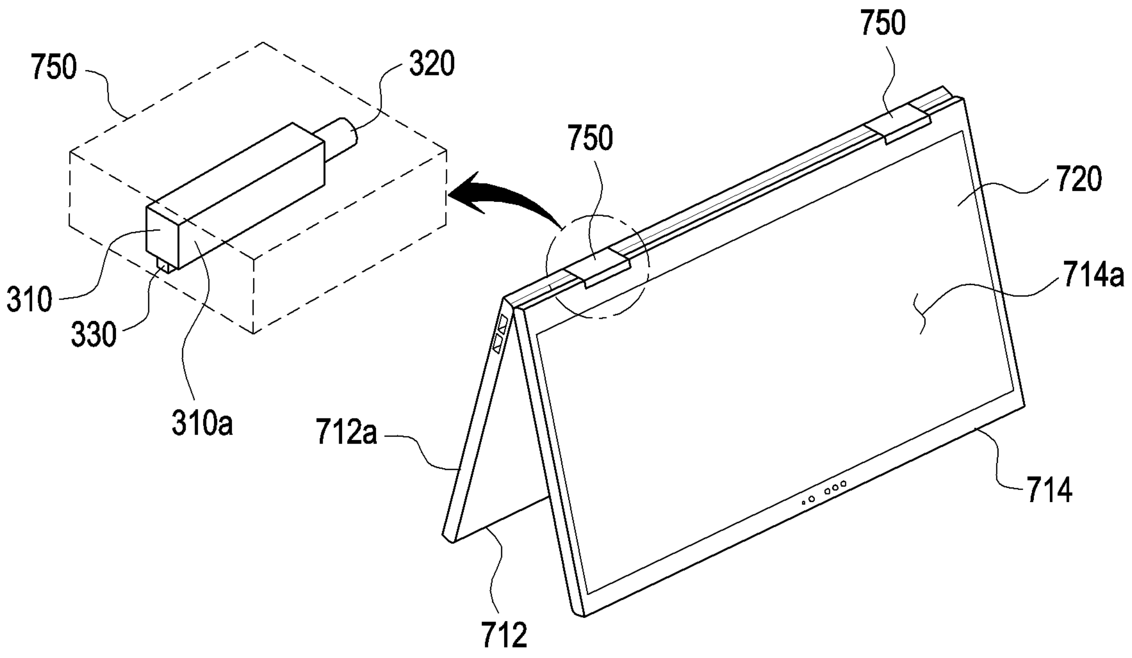
FIG. 10C is a diagram illustrating an embodiment in which the antenna module 310 of FIG. 3 is mounted in the hinge module in the second state (e.g., tablet mode) of the electronic device 101 of FIG. 7.

FIG. 10A is a diagram illustrating an embodiment in which the antenna module 310 of FIG. 3 is mounted in the hinge module in the closed state of the electronic device 101 of FIG. 7. FIG. 10B is a diagram illustrating an embodiment in which the antenna module 310 of FIG. 3 is mounted in the hinge module in the first state (e.g., clamshell mode) of the electronic device 101 of FIG. 7. FIG. 10C is a diagram illustrating an embodiment in which the antenna module 310 of FIG. 3 is mounted in the hinge module in the second state (e.g., tablet mode) of the electronic device 101 of FIG. 7.

Referring to FIGS. 10A and 10B, the first housing 712 and the second housing 714 of the electronic device 101 may be coupled to different shaft structures of the hinge module 750 and rotate with respect to each other using the hinge module 750 around a rotation axis corresponding to the corresponding shaft structures. According to an embodiment, when the first housing 712 and the second housing 714 of the electronic device 101 rotate with respect to each other, the hinge module 750 may rotate by a specified angular range (e.g., about 0 degrees to 180 degrees). For example, when the electronic device 101 is in the closed state, the hinge module 750 may maintain an initial angle of about 0 degrees. When the electronic device 101 is in the first state, the hinge module 750 may rotate within a range of about 0 to 90 degrees, and when the electronic device 101 is in the second state, the hinge module 750 may maintain about 90 degrees with respect to the initial angle. According to an embodiment, the antenna module 310 may be mounted within the hinge module 750. According to an embodiment, when mounted within the hinge module 750, the antenna module 310 may be coupled to the hinge module 750 through the antenna connector 320 at a position other than a rotation axis around which the first housing 712 and the second housing 714 rotate.

According to an embodiment, when the electronic device 101 is used in the closed state (e.g., FIG. 10A), the hinge module 750 is not rotated by the housings 712 and 714, and thus the first surface 310*a* of the antenna module 310 may maintain vertical with respect to the ground. According to an embodiment, when the electronic device 101 is used in the first state (e.g., FIG. 10B), the weight 330 coupled to the antenna module 310 may enable the first surface 310*a* of the antenna module 310 to maintain vertical with respect to the ground, even if the antenna module 310 rotates as the hinge module 750 rotates by the rotation of the housings 712 and 714. For example, because the antenna module 310 is rotatable with respect to the antenna connector 320 even when the antenna connector 320 is coupled to the hinge module 750 and rotates in the same direction as the hinge module 750, the antenna module 310 may be rotated by the weight 330 coupled to the antenna module 310 by the same angle in a direction opposite to the direction in which the hinge module 750 rotates, thereby enabling the first surface 310*a* of the antenna module 310 to maintain vertical with respect to the ground.

According to an embodiment, when the electronic device 101 is used in a third state (e.g., FIG. 10C), even if the antenna module 310 rotates as the hinge module 750 rotates by rotation of the housings 712 and 714, the weight 330 coupled to the antenna module 310 may enable the first surface 310*a* of the antenna module 310 to maintain vertical with respect to the ground. For example, because the hinge module 750 rotates by about 90 degrees from the closed state in the third state, the antenna module 310 coupled to the hinge module 750 through the antenna connector 320 also rotates in the same direction by about 90 degrees. However, since the antenna module 310 is rotatable with respect to the antenna connector 320, the antenna module 310 may be rotated, by the weight 330 coupled to the antenna module 310, by about 90 degrees in the direction opposite to the direction in which the hinge module 750 rotates. Accordingly, the first surface 310*a* of the antenna module 310 may maintain vertical with respect to the ground.

An electronic device with communication functionality, such as a portable terminal, becomes smaller and lighter to maximize portability and convenience for a user and increasingly has integrated components in a smaller space for high performance. An electronic device (e.g., a laptop) may provide information to a user using a display in an unfolded state, and may be closed for portability when the electronic device is not in use.

An electronic device may include a main body, a display, and an antenna module electrically connected to the main body, for communication between the electronic device and the outside. When the antenna module is configured in such a way that it is mounted within the electronic device, a plurality of antenna modules may be arranged in consideration of the state of the electronic device and the radiation direction of an antenna. For example, the plurality of antenna modules may be arranged on both side surfaces of a set of multiple ports in the main body of the electronic device. Accordingly, a mounting space of the multiple ports may be obstructed by the plurality of antenna modules, or it may be necessary to secure a separate space for mounting the antenna modules.

Further, when the antenna module is configured in such a way that it is mounted in a spare space (e.g., a hinge) of the display of the electronic device, the orientation of the antenna module may change depending on the opening angle of a screen of the electronic device. Accordingly, there may be a need for disposing an additional antenna module.

According to an embodiment of the disclosure, it an electronic device with an antenna module mounted in a space adjacent to a hinge of the electronic device may be provided.

According to one embodiment of the disclosure, a structure of an antenna module that maintains the orientation of the antenna module regardless of the opening angle of an electronic device may be provided.

However, the problems to be solved by the disclosure are not limited to the above-mentioned problems, and may be extended in various ways without departing from the spirit and scope of the disclosure.

An electronic device according to an embodiment of the disclosure may maximize space utilization of the electronic device by mounting an antenna module in a spare space adjacent to a hinge of the electronic device.

An electronic device according to an embodiment of the disclosure may improve its communication performance by allowing an antenna module to have an intended radiation direction without increasing the number of antenna modules.

In addition, various other effects identified herein, either directly or indirectly, may be provided.

According to an embodiment of the disclosure, an electronic device (e.g., the electronic device 101 in FIGS. 1 and 5) may include a display panel, a first housing in which the display panel is disposed, an input module, a second housing in which the input module is disposed, wherein the first housing is configured to be rotatable with respect to the second housing, a hinge module connected to the first housing and the second housing, fixed to the second housing, and forming a rotation axis for rotation of the first housing, and an antenna unit connected to at least a portion of the rotation axis of the hinge module. The antenna unit may include a connector connected to the at least portion of the rotation axis, an antenna module connected to the connector and rotatable with respect to the connector around the rotation axis, and a weight connected to at least a portion of the antenna module and mounted to maintain a radiation surface of the antenna module substantially vertical with respect to a ground.

In the electronic device (e.g., the electronic device 101 in FIGS. 1 and 5) according to an embodiment, the antenna module may be disposed with the radiation surface substantially perpendicular to the ground.

In the electronic device (e.g., the electronic device 101 in FIGS. 1 and 5) according to an embodiment, a signal radiated from the radiation surface may include an mmWave signal.

In the electronic device (e.g., the electronic device 101 in FIGS. 1 and 5) according to an embodiment, the first housing and the antenna module may rotate in opposite directions around the rotation axis.

In the electronic device (e.g., the electronic device 101 in FIGS. 1 and 5) according to an embodiment, an absolute value of an angle by which the first housing rotates around the rotation axis may be substantially equal to an absolute value of an angle by which the antenna module rotates around the rotation axis.

In the electronic device (e.g., the electronic device 101 in FIGS. 1 and 5) according to an embodiment, the antenna module may include a cuboidal shape, and each of a surface to which the connector is connected, the radiation surface, and a surface on which the weight is mounted may be perpendicular in the cuboidal shape.

According to an embodiment of the disclosure, an electronic device (e.g., the electronic device 101 in FIGS. 1 and 6) may include a display panel, a first housing in which the display panel is disposed, an input module, a second housing in which the input module is disposed, wherein the first housing is configured to be rotatable with respect to the second housing, a hinge module connected to the first housing and the second housing, fixed to the second housing, and forming a first rotation axis for rotation of the first housing, and an antenna unit connected to at least a portion of the first housing at a lower side of the display panel. The antenna unit provided inside the hinge module may include a connector connected to the at least portion of the first housing and rotating around the first rotation axis, an antenna module connected to the connector and rotatable with respect to the connector around a second rotation axis different from the first rotation axis, and a weight connected to at least a portion of the antenna module and mounted to maintain a radiation surface of the antenna module substantially vertical with respect to a ground.

In the electronic device (e.g., the electronic device 101 in FIGS. 1 and 6) according to an embodiment, the antenna module may be disposed with the radiation surface substantially perpendicular to the ground.

In the electronic device (e.g., the electronic device 101 in FIGS. 1 and 6) according to an embodiment, the signal may include an mmWave signal.

In the electronic device (e.g., the electronic device 101 in FIGS. 1 and 6) according to an embodiment, the first housing and the antenna module may rotate in opposite directions around the first rotation axis and the second rotation axis, respectively.

In the electronic device (e.g., the electronic device 101 in FIGS. 1 and 6) according to an embodiment, an absolute value of an angle by which the first housing rotates around the first rotation axis may be substantially equal to an absolute value of an angle by which the antenna module rotates around the second rotation axis.

In the electronic device (e.g., the electronic device 101 in FIGS. 1 and 6) according to an embodiment, the antenna module may include a cuboidal shape, and each of a surface to which the connector is connected, the radiation surface, and a surface on which the weight is mounted may be perpendicular in the cuboidal shape.

According to an embodiment of the disclosure, an electronic device (e.g., the electronic device 101 in FIGS. 1, 7 and 8) may include a display panel, a first housing in which the display panel is disposed, a second housing configured to be rotatable with respect to the first housing, a hinge module connected to the first housing and the second housing, and forming or defining a first rotation axis for rotation of the first housing and a second rotation axis parallel to the first rotation axis, for rotation of the second housing, and an antenna unit connected to at least a portion of the hinge module. The antenna unit may include a connector connected to the at least portion of the hinge module, an antenna module connected to the connector and rotatable with respect to the connector around a third rotation axis, and a weight connected to at least a portion of the antenna module to maintain a radiation surface of the antenna module substantially vertical with respect to a ground.

In the electronic device (e.g., the electronic device 101 in FIGS. 1, 7 and 8) according to an embodiment, the antenna module may be disposed with the radiation surface substantially perpendicular to the ground.

In the electronic device (e.g., the electronic device 101 in FIGS. 1, 7 and 8) according to an embodiment, the signal may include an mmWave signal.

In the electronic device (e.g., the electronic device 101 in FIGS. 1, 7 and 8) according to an embodiment, the antenna module may include a cuboidal shape, and each of a surface to which the connector is connected, the radiation surface, and a surface on which the weight is mounted may be perpendicular in the cuboidal shape.

The electronic device (e.g., the electronic device 101 in FIGS. 1, 7 and 8) according to an embodiment may be configured to operate in a first state mode or a second state mode according to an angle formed by the first housing and the second housing.

In the electronic device (e.g., the electronic device 101 in FIGS. 1, 7 and 8) according to an embodiment, the first state mode may include a clamshell mode, and the second state module may include a tablet mode.

When the electronic device (e.g., the electronic device 101 in FIGS. 1, 7 and 8) according to an embodiment is used in the first state mode, an absolute value of an angle by which the hinge module rotates may be substantially equal to an absolute value of an angle by which the antenna module rotates.

When the electronic device (e.g., the electronic device 101 in FIGS. 1, 7 and 8) according to an embodiment is used in the second state mode, the antenna module may rotate by 90 degrees to maintain the radiation surface substantially perpendicular to the ground.

The above-described electronic device according to an embodiment of the disclosure is not limited by the foregoing embodiments and drawings, and it will be apparent to those skilled in the art that many replacements, changes, and modifications can be made within the technical scope of the disclosure.

What is claimed is:

1. An electronic device comprising:

a display panel;

a first housing at which the display panel is disposed;

an input module;

a second housing at which the input module is disposed;

a hinge module fixably connected to the second housing;

a connector connected to the first housing, and rotatably connected to the hinge module and configured to rotate about an axis, wherein rotation of the connector about the axis rotates the first housing about the axis;

an antenna module rotatably coupled to the connector and configured to rotate relative to the connector with respect to the axis independently from the first housing; and a weight connected to at least a portion of the antenna module to maintain a radiation surface of the antenna module substantially vertical with respect to a ground.

2. The electronic device of claim 1, wherein the antenna module is disposed such that the radiation surface is substantially perpendicular to the ground.

3. The electronic device of claim 1, wherein a signal radiated from the radiation surface includes an mmWave signal.

4. The electronic device of claim 1, wherein the first housing and the antenna module rotate in an opposite direction with respect to the rotation axis.

5. The electronic device of claim 1, wherein an absolute value of an angle by which the first housing rotates around the rotation axis is substantially equal to an absolute value of an angle by which the antenna module rotates around the rotation axis.

6. The electronic device of claim 1, wherein the antenna module comprises a cuboidal shape, and wherein, in the cuboidal shape, a surface to which the connector is connected, the radiation surface, and a surface on which the weight is mounted are respectively perpendicular.

7. An electronic device comprising:
- a first housing including a display panel thereon an input module;
- a second housing including an input module thereon;
- a hinge module fixed to the second housing; and
- an antenna unit provided inside of the hinge module and connected to, around a lower edge of the display panel, and connected to at least a portion of the first housing,
- wherein the antenna unit includes:
- a connector connected to the at least a portion of the first housing and configured to rotate with respect to a first rotation axis within the hinge module;
- an antenna module rotatably coupled to the connector and configured to independently rotate relative to the connector with respect to a second rotation axis different from the first rotation axis; and
- a weight connected to at least a portion of the antenna module to maintain a radiation surface of the antenna module substantially vertical with respect to a ground.

8. The electronic device of claim 7, wherein the antenna module is disposed such that the radiation surface is substantially perpendicular to the ground.

9. The electronic device of claim 7, wherein a signal radiated from the radiation surface includes an mmWave signal.

10. The electronic device of claim 7, wherein the first housing and the antenna module rotate in an opposite direction with respect to the first rotation axis and the second rotation axis, respectively.

11. The electronic device of claim 7, wherein an absolute value of an angle by which the first housing rotates around the first rotation axis is substantially equal to an absolute value of an angle by which the antenna module rotates around the second rotation axis.

12. The electronic device of claim 7, wherein the antenna module comprises a cuboidal shape, and wherein, in the cuboidal shape, a surface to which the connector is connected, the radiation surface, and a surface on which the weight is mounted are respectively perpendicular.

13. An electronic device comprising:
- a first housing including a display panel thereon;
- a second housing configured to be rotatable relative to the first housing;
- a hinge module connected to the first housing and the second housing, the hinge module defining a first rotation axis for rotation of the first housing and a second rotation axis, parallel to the first rotation axis, for rotation of the second housing; and
- an antenna unit connected to at least a portion of the hinge module,
- wherein the antenna unit includes:
- a connector connected to the at least a portion of the hinge module and configured to rotate about one of the first rotation axis and the second rotation axis independently from the first housing or the second housing rotation about the other of the first rotation axis and the second rotation axis;
- an antenna module rotatably coupled to the connector and configured to rotate relative to the connector with respect to a third rotation axis; and
- a weight connected to at least a portion of the antenna module to maintain a radiation surface of the antenna module substantially vertical with respect to a ground.

14. The electronic device of claim 13, wherein the electronic device is configured to operate in a first state mode or a second state mode according to an angle formed by the first housing and the second housing, and
- wherein the first state mode includes a clamshell mode, and the second state mode includes a tablet mode.

15. The electronic device of claim 14, wherein, when the electronic device is used in the first state mode, an absolute value of an angle by which the hinge module rotates is substantially equal to an absolute value of an angle by which the antenna module rotates, and wherein, when the electronic device is used in the second state mode, the antenna module rotates by 90 degrees to maintain the radiation surface substantially perpendicular to the ground.

* * * * *